(12) United States Patent
Porwal

(10) Patent No.: US 12,440,236 B2
(45) Date of Patent: Oct. 14, 2025

(54) DEVICE FOR THE TREATMENT OF ANAL FISTULA-IN-ANO AND COMPLEX FISTULA-IN-ANO

(71) Applicant: HEALING HANDS CLINIC PRIVATE LIMITED, Pune (IN)

(72) Inventor: Ashwin Dhanrajii Porwal, Pune (IN)

( * ) Notice: Subject to any disclaimer, the term of this patent is extended or adjusted under 35 U.S.C. 154(b) by 775 days.

(21) Appl. No.: 17/598,112

(22) PCT Filed: Feb. 25, 2020

(86) PCT No.: PCT/IN2020/050165
§ 371 (c)(1),
(2) Date: Sep. 24, 2021

(87) PCT Pub. No.: WO2021/117049
PCT Pub. Date: Jun. 17, 2021

(65) Prior Publication Data
US 2022/0168009 A1 Jun. 2, 2022

(30) Foreign Application Priority Data

Dec. 11, 2019 (IN) .............................. 201921051182

(51) Int. Cl.
*A61B 17/3205* (2006.01)
*A61B 17/32* (2006.01)
*A61M 3/02* (2006.01)

(52) U.S. Cl.
CPC ......... *A61B 17/3205* (2013.01); *A61M 3/027* (2013.01); *A61M 3/0283* (2013.01); *A61M 3/0295* (2013.01); *A61B 2017/320004* (2013.01); *A61B 2217/005* (2013.01); *A61B 2217/007* (2013.01); *A61M 2210/1067* (2013.01)

(58) Field of Classification Search
CPC .............. A61M 3/0283; A61M 3/0295; A61M 2210/1067; A61B 2217/005; A61B 2217/007
See application file for complete search history.

(56) References Cited

U.S. PATENT DOCUMENTS

| | | | | |
|---|---|---|---|---|
| 5,354,279 | A * | 10/1994 | Hofling | A61M 25/0084 604/173 |
| 10,849,730 | B2 * | 12/2020 | Sachar | A61L 29/16 |
| 2007/0276427 | A1 * | 11/2007 | Euteneuer | A61M 25/10 604/164.13 |

(Continued)

OTHER PUBLICATIONS

International Search Report for PCT/IN2020/050165 mailed on Apr. 6, 2020.

*Primary Examiner* — Scott J Medway
(74) *Attorney, Agent, or Firm* — UNDERWOOD & ASSOCIATES, LLC

(57) ABSTRACT

A device for the treatment of anal fistula-in-ano and complex fistula-in-ano includes a balloon inflation/deflation tube, a suction/drainage tube, a scooping tube, that is disposed between the balloon inflation/deflation tube and the suction/drainage tube, a diaphragm that is disposed across the balloon inflation/deflation tube and the suction/drainage tube, and an irrigation/drainage path that is disposed between a balloon and a plurality of spikes. The balloon is disposed at an end of the balloon inflation/deflation tube.

7 Claims, 3 Drawing Sheets

(56) References Cited

U.S. PATENT DOCUMENTS

| | | | |
|---|---|---|---|
| 2008/0058836 A1* | 3/2008 | Moll | A61B 17/12172 606/130 |
| 2010/0256447 A1* | 10/2010 | Dubi | A61B 1/00135 600/115 |
| 2011/0282324 A1* | 11/2011 | Kurokawa | A61B 17/12186 604/514 |
| 2011/0282368 A1* | 11/2011 | Swayze | A61B 17/32002 606/213 |
| 2015/0101598 A1* | 4/2015 | Wang | A61M 16/0459 128/202.16 |
| 2016/0038128 A1 | 2/2016 | Carrison | |
| 2018/0049626 A1* | 2/2018 | Slate | A61B 1/31 |
| 2022/0000896 A1* | 1/2022 | Ning | A61L 31/16 |

* cited by examiner

DEVICE FOR THE TREATMENT OF ANAL FISTULA-IN-ANO AND COMPLEX FISTULA-IN-ANO

FIELD OF THE INVENTION

The present disclosure generally relates to surgical devices for the treatment of fistula-in-ano.

BACKGROUND OF THE INVENTION

An anal fistula is a tunnel that forms under the perianal skin and connects clogged infected glands to an abscess. Its treatment includes abscess drainage through surgical opening made in perianal skin. However, even if the skin of the surgical opening heals, the persisting fistula track may cause recurrence of an abscess.

To allow proper healing of the skin and the fistula track, a seton ring is placed on the fistula track to keep surgical opening and the fistula track open. This ring may be a thread operable to be placed in the fistula track, and thereafter, it may be sutured or knotted outside (over the perianal skin). Such outside knot causes pain and discomfort to the patient, and may tend to open with time. Also, the procedure of placing the ring is time-consuming and cumbersome.

Alternatively, a smooth and flexible ring may be used. Specifically such ring may use a connector to join to ends of the ring (instead of using knots). However, due to the flexible nature of such a ring, a procedure of placing it in the fistula track, particularly, connecting the two ends still remain cumbersome and time-consuming.

Thus, treatment of fistula-in-ano remains challenging. No definitive medical therapy is available for its treatment. Surgery is the treatment of choice, with the goals of draining infection, eradicating the fistulous tract, and avoiding persistent or recurrent disease while preserving anal sphincter function.

However, there is no recommended surgery as yet for anal fistula. The surgeon has to decide the procedure based on his past experience and the type of fistula he/she is dealing with.

There is, therefore, a need in the art for a device for the treatment of anal fistula-in-ano and complex fistula-in-ano, which overcomes the aforementioned drawbacks and shortcomings.

SUMMARY OF THE INVENTION

A device for the treatment of anal fistula-in-ano and complex fistula-in-ano is disclosed. The device comprises: a balloon inflation/deflation tube; a scooping tube; a suction/drainage tube; a diaphragm; an irrigation/drainage path; a balloon; and a plurality of spikes.

The balloon inflation/deflation tube is configured to inflate or deflate the balloon that is disposed at an end of the balloon inflation/deflation tube, said balloon creating a barrier between the anal canal and the fistula of a patient.

The suction/drainage tube is configured to irrigate/drain the debris from internal wound of fistula and intersphincteric space.

Through the scooping tube, which is disposed between the balloon inflation/deflation tube and the suction/drainage tube the wound is scooped and debridement is carried out.

The diaphragm holds the device in its place and keeps the neck of fistula wide for drainage to prevent premature closure, said diaphragm being disposed across the balloon inflation/deflation tube and the suction/drainage tube.

The irrigation/drainage path is disposed between the balloon and a plurality of spikes, said irrigation/drainage path facilitating the irrigation and debridement of the abscess wall.

The plurality of spikes is disposed on an outer surface of both the balloon inflation/deflation tube and the suction/drainage tube, said plurality of spikes facilitating the adhering of the balloon inflation/deflation tube and the suction/drainage tube to the cavity, in addition to debridement.

The disclosed device offers the following advantages: prevents premature closure of fistula wound, thereby minimizing the chances of recurrence; easy to use, thus avoiding the need for a skilled medical practitioner; sphincter remains untouched, hence does not cause incontinence; minimal pain; and less time consuming.

DETAILED DESCRIPTION OF THE INVENTION

Throughout this specification, the use of the word "comprise" and "include", and variations such as "comprises" "comprising", "includes", and "including" may imply the inclusion of an element or elements not specifically recited.

Throughout this specification, the disclosure of any range is to be construed as being inclusive of the lower limit of the range and the upper limit of the range.

Figure 1:
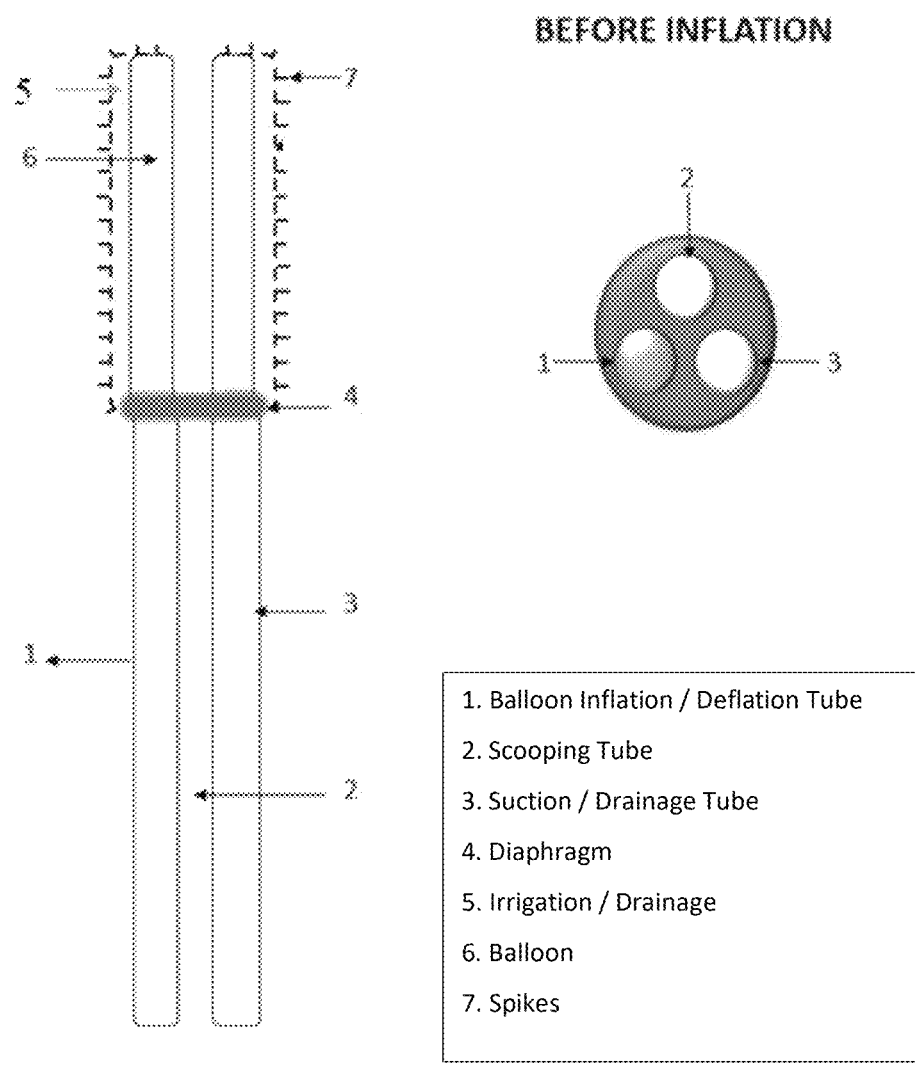
FIG. 1 illustrates an embodiment of a device for the treatment of anal fistula-in-ano and complex fistula-in-ano, in accordance with the present disclosure.

A device for the treatment of anal fistula-in-ano and complex fistula-in-ano is disclosed. As illustrated in FIG. 1, the device comprises: a balloon inflation/deflation tube (1); a scooping tube (2); a suction/drainage tube (3); a diaphragm (4); an irrigation/drainage path (5); a balloon (6); and a plurality of spikes (7).

The device is held in place at the diaphragm (4), which also keeps the neck of fistula wide for drainage to prevent premature closure. The diaphragm (4) is disposed across the balloon inflation/deflation tube (1) and the suction/drainage tube (3).

The balloon inflation/deflation tube (1) is configured to inflate or deflate the balloon (6) that is disposed at an end of the balloon inflation/deflation tube (1). The balloon creates a barrier between the anal canal and the fistula of a patient.

The suction/drainage tube (3) is configured to irrigate/drain the debris from internal wound of fistula and intersphincteric space, while the wound is scooped in postoperative care and debridement is carried out through the scooping tube (2) that is disposed between the balloon inflation/deflation tube (1) and the suction/drainage tube (3).

Once the intersphincteric space infection is drained, the mucosa over the internal opening gets closed. This helps in closure of the internal opening by separation. It also keeps the intersphincteric space or abscess cavity open for drainage.

The plurality of spikes (7) is disposed on an outer surface of the irrigation/drainage path (5) and facilitates the adhering of the balloon inflation/deflation tube (1) and the suction/ drainage tube (3) to the cavity, in addition to debridement. The irrigation/drainage path (5) is disposed between the balloon (6) and the plurality of spikes (7), and facilitates the irrigation and debridement of the abscess wall, thereby fastening the process of internal healing.

The length of the balloon inflation/deflation tube (1) can be customized by a treating surgeon from case-to-case. In an embodiment of the present disclosure, the length of the balloon inflation/deflation tube (1), ranges between 5 cm and 25 cm.

In another embodiment of the present disclosure, the length of the scooping tube (2) ranges between 5 cm and 25 cm.

The length of the suction/drainage tube (3) can be customized by a treating surgeon from case-to-case. In yet another embodiment of the present disclosure, the length of the suction/drainage tube (3) ranges between 5 cm and 25 cm.

In yet another embodiment of the present disclosure, the length of the diaphragm (4) ranges between 1 cm and 5 cm.

In yet another embodiment of the present disclosure, the expansion capacity of the balloon (6) ranges between 1 ml and 7 ml.

Figure 2:
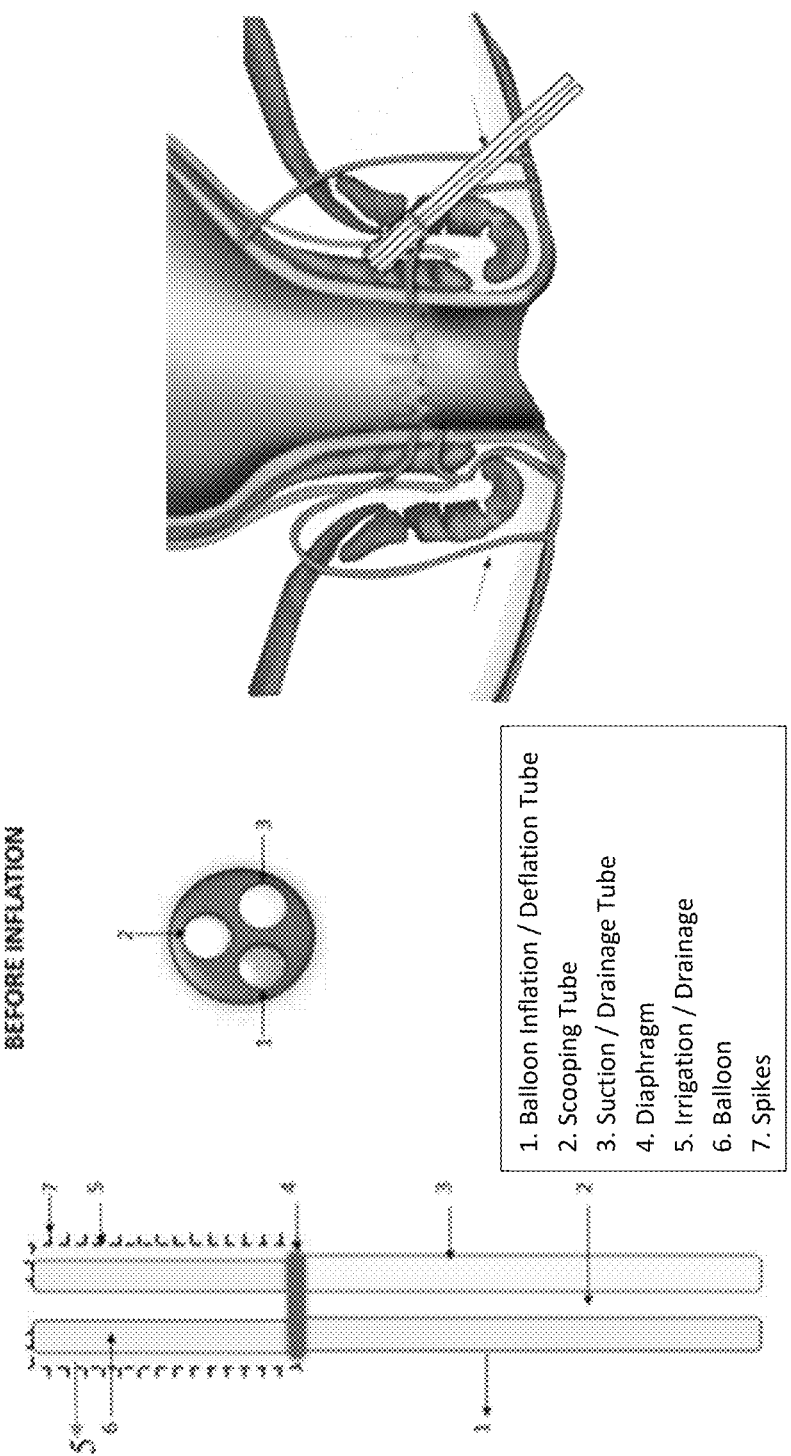
FIG. 2 illustrates a method of operation of a device for the treatment of anal fistula-in-ano and complex fistula-in-ano (before inflation), in accordance with the present disclosure.
Figure 3:
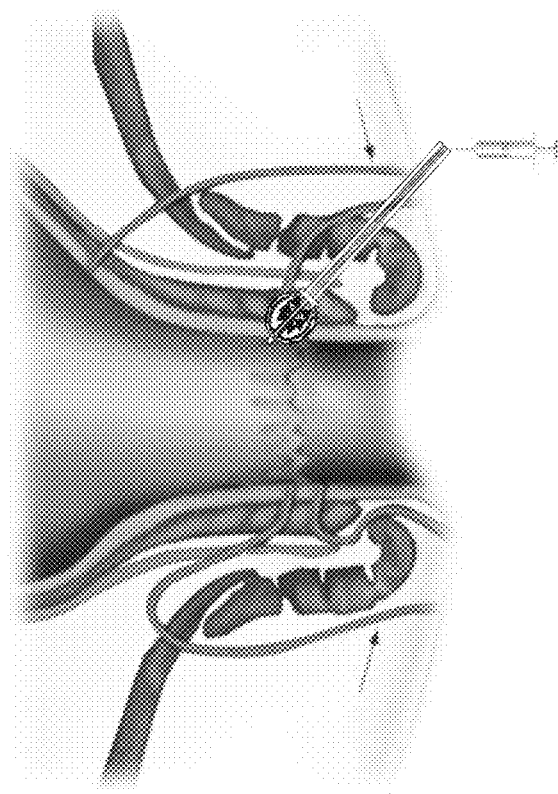
FIG. 3 illustrates a method of operation of a device for the treatment of anal fistula-in-ano and complex fistula-in-ano (after inflation), in accordance with the present disclosure.
Figure 3:
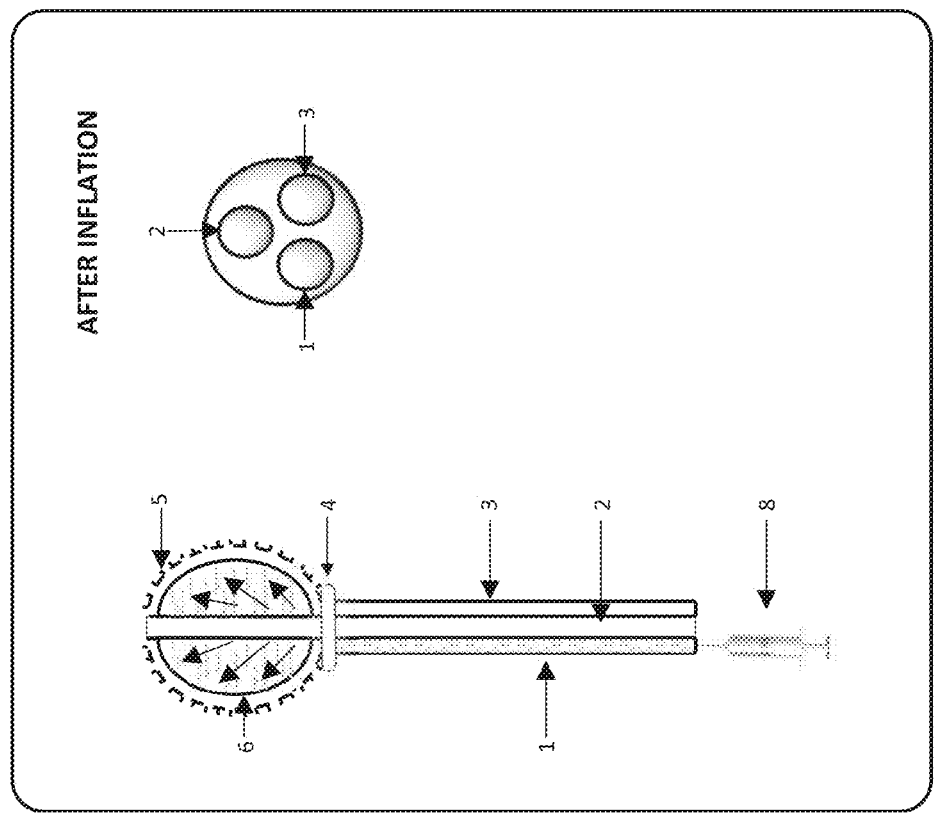

The method of operation of the device is illustrated in FIG. 2 and FIG. 3, and comprises the steps of:
 debriding the internal opening and draining the intersphincteric abscess;
 introducing the device into the fistula tract over a guide wire or fistula probe, with the balloon (6) being placed close to the internal opening;
 inserting the end of the balloon inflation/deflation tube (1) at which the balloon (6) is disposed, into the external opening of the fistula;
 passing the end of the balloon inflation/deflation tube (1) at which the balloon (6) is disposed, through the complete length of the tract till it passes through the internal opening;
 fixing a sterile water filled syringe (8) into the balloon inflation/deflation tube (1) and inflating the balloon (6) up to required capacity (not exceeding 20 ml);
 making sure that the diaphragm (4) is in its place to prevent premature closure of the fistula tract;
 irrigating and draining through the device by use of a cleaning solution; and
 removing the device once the internal opening heals.

In yet another embodiment of the present disclosure, the device is made of high standard medicated latex materials.

In yet another embodiment of the present disclosure, the cleaning solution is a liquid solution that comprises hydrogen peroxide, povidone-iodine, eusol, copper suphate, water, and/or saline.

The disclosed device offers the following advantages: prevents premature closure of fistula wound, thereby minimizing the chances of recurrence; easy to use, thus avoiding the need for a skilled medical practitioner; sphincter remains untouched, hence does not cause incontinence; minimal pain; and less time consuming.

It will be apparent to a person skilled in the art that the above description is for illustrative purposes only and should not be considered as limiting. Various modifications, additions, alterations and improvements without deviating from the spirit and the scope of the disclosure may be made by a person skilled in the art. Such modifications, additions, alterations and improvements should be construed as being within the scope of this disclosure.

LIST OF REFERENCE NUMERALS

1—Balloon Inflation/Deflation Tube
2—Scooping Tube/Introduction of Device over Guide Wire
3—Suction/Drainage Tube
4—Diaphragm
5—Irrigation/Drainage Path
6—Balloon
7—Plurality of Spikes
8—Syringe

I claim:

1. A device for the treatment of anal fistula-in-ano and complex fistula-in-ano, comprising:
 a balloon inflation or deflation tube that is configured to inflate or deflate a balloon that is disposed at an end of the balloon inflation or deflation tube, said balloon configured to create a barrier between an anal canal and a fistula of a patient;
 a suction or drainage tube that is configured to drain debris from an internal wound of the fistula and intersphincteric space;
 a scooping tube through which the internal wound of the fistula is scooped and debridement is carried out, said scooping tube being disposed adjacent to the balloon inflation or deflation tube and also adjacent to the suction or drainage tube;
 a diaphragm that holds the device in place and keeps a neck of the fistula wide for drainage to prevent premature closure, said diaphragm being disposed across the balloon inflation or deflation tube and the suction or drainage tube; and
 an irrigation or drainage path disposed on an outer surface of the balloon, said irrigation or drainage path facilitating irrigation of an abscess wall; and
 a plurality of spikes disposed on an external surface of said irrigation or drainage path that facilitates adhesion of the balloon inflation or deflation tube and the suction or drainage tube to a cavity.

2. The device for the treatment of anal fistula-in-ano and complex fistula-in-ano as claimed in claim 1, wherein a length of the balloon inflation or deflation tube ranges between 5 cm and 25 cm.

3. The device for the treatment of anal fistula-in-ano and complex fistula-in-ano as claimed in claim 1, wherein a length of the scooping tube ranges between 5 cm and 25 cm.

4. The device for the treatment of anal fistula-in-ano and complex fistula-in-ano as claimed in claim 1, wherein a length of the suction or drainage tube ranges between 5 cm and 25 cm.

5. The device for the treatment of anal fistula-in-ano and complex fistula-in-ano as claimed in claim 1, wherein a length of the diaphragm ranges between 1 cm and 5 cm.

6. The device for the treatment of anal fistula-in-ano and complex fistula-in-ano as claimed in claim 1, wherein an expansion capacity of the balloon ranges between 1 mL and 7 mL.

7. The device for the treatment of anal fistula-in-ano and complex fistula-in-ano as claimed in claim 1, wherein the balloon is configured to be inflated by a sterile, water-filled syringe.

\* \* \* \* \*